United States Patent
Sigg et al.

(10) Patent No.: US 8,768,363 B1
(45) Date of Patent: *Jul. 1, 2014

(54) RESOURCE ALLOCATION BASED ON WIRELESS DEVICE MOTION SPECIFIED IN CONNECTION REQUEST

(71) Applicant: Sprint Spectrum, L.P., Overland Park, KS (US)

(72) Inventors: Jason P. Sigg, Overland Park, KS (US); Ashish Bhan, Shawnee, KS (US); Maulik K. Shah, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 5 days.

This patent is subject to a terminal disclaimer.

(21) Appl. No.: 13/942,174

(22) Filed: Jul. 15, 2013

Related U.S. Application Data

(63) Continuation of application No. 13/085,893, filed on Apr. 13, 2011, now Pat. No. 8,521,168.

(51) Int. Cl.
*H04W 36/00* (2009.01)

(52) U.S. Cl.
USPC ........... 455/441; 455/436; 455/440; 455/443; 455/444

(58) Field of Classification Search
USPC ................................. 455/436–444
See application file for complete search history.

(56) References Cited

U.S. PATENT DOCUMENTS

| | | | | |
|---|---|---|---|---|
| 5,790,528 A * | 8/1998 | Muszynski | 370/331 |
| 5,828,661 A * | 10/1998 | Weaver et al. | 370/331 |
| 5,901,145 A * | 5/1999 | Sawyer | 370/332 |
| 5,987,013 A * | 11/1999 | Kabasawa | 370/331 |
| 6,011,971 A * | 1/2000 | Jolma | 455/438 |
| 6,075,990 A * | 6/2000 | Shin | 455/440 |
| 6,111,864 A * | 8/2000 | Kabasawa | 370/332 |
| 6,230,013 B1 * | 5/2001 | Wallentin et al. | 455/436 |
| 6,289,221 B1 * | 9/2001 | Ritter | 455/447 |
| 6,567,670 B1 * | 5/2003 | Petersson | 455/522 |
| 6,728,528 B1 * | 4/2004 | Loke | 455/318 |
| 6,980,805 B2 * | 12/2005 | Matsumoto et al. | 455/440 |
| 7,082,305 B2 * | 7/2006 | Willars et al. | 455/441 |
| 7,096,019 B2 * | 8/2006 | Wang | 455/437 |
| 7,233,797 B2 * | 6/2007 | Kanagawa | 455/446 |
| 7,349,699 B1 * | 3/2008 | Kelly et al. | 455/444 |
| 7,548,751 B2 * | 6/2009 | Katori et al. | 455/443 |
| 7,558,575 B2 * | 7/2009 | Losh et al. | 455/441 |
| 2003/0083072 A1 * | 5/2003 | Mostafa | 455/446 |
| 2005/0026614 A1 * | 2/2005 | Otsuka et al. | 455/436 |

* cited by examiner

*Primary Examiner* — Lester Kincaid
*Assistant Examiner* — Mehmood B Khan

(57) ABSTRACT

A method and corresponding system is disclosed for enhanced resource allocation in a wireless communication system. According to the method, when an idle wireless device seeks to initiate a call in a given coverage area, the device will provide with its initiation request to the serving radio network a motion specification indicating an extent of movement of the device, based on the device's tracking of its own movement. The network will then use that motion specification provided with the initiation request as a basis to determine whether to select a resource to allocate for the call in the given coverage area based on resource implementation in at least one neighboring coverage area or whether to instead select the resource to allocate without regard to resource allocation in the at least one neighboring coverage area.

19 Claims, 6 Drawing Sheets

RESOURCE ALLOCATION BASED ON WIRELESS DEVICE MOTION SPECIFIED IN CONNECTION REQUEST

REFERENCE TO RELATED APPLICATION

This is a continuation of U.S. patent application Ser. No. 13/085,893, filed Apr. 13, 2011, the entirety of which is hereby incorporated by reference.

BACKGROUND

In a typical cellular wireless communication system, a radio access network (RAN) includes a plurality of base stations, each of which radiates to define one or more wireless coverage areas such as a cell and cell sectors in which wireless communication devices (WCDs) can be served by the RAN and can thereby obtain connectivity with broader networks such as the public switched telephone network (PSTN) and the Internet.

In general, each coverage area defined by the RAN may have various types of resources that the RAN can allocate for use to support calls (e.g., voice calls or data communication sessions) by WCDs. For instance, air interface communications in each coverage area may occur on one or more carrier frequencies, and the RAN may direct the WCD to communicate on a particular one of the carrier frequencies implemented in that coverage area. As another example, the air interface of each coverage area (e.g. on each carrier frequency) may define a number of traffic channels, and the RAN may direct the WCD to communicate on a particular one of those traffic channels. Other examples exist as well.

OVERVIEW

When a WCD initiates a call in a given coverage area of a wireless communication system, at issue may therefore be which particular RAN resource of a given type the RAN should allocate for use by the WCD in that coverage area. For instance, if the coverage area operates on multiple carrier frequencies (e.g., multiple pairs of carrier frequencies), at issue may be which carrier frequency the RAN should allocate for use by the WCD. And as another example, if a coverage area defines a number of traffic channels, at issue may be which traffic channel the RAN should allocate for use by the WCD.

In practice, to initiate a call in a given coverage area, a WCD may transmit a connection initiation request to the RAN via an air interface access channel defined in the coverage area. Upon receipt of the connection initiation request, the RAN may then select particular RAN resources (e.g., a particular carrier frequency and a particular traffic channel) and direct the WCD to commence the call using those resources in the coverage area. The call may then proceed accordingly.

Given the mobility of a typical WCD, however, there is a chance that the WCD may move from one coverage area to another during the course of a call. When that happens, the WCD may work with the RAN to arrange for handoff of the call to the new coverage area, and the RAN may select and assign RAN resources for the call in the new coverage area and release the resources that the RAN had assigned for the call in the initial coverage area.

When a WCD transitions from one coverage area to another during an active call, it would be optimal for the WCD to continue communicating on the same carrier frequency that it was using, to avoid the need for the WCD and RAN to re-tune to a different frequency mid-call. Continuing to use communicate on the same carrier frequency would be impossible, however, in a scenario where the WCD is moving into a new coverage area that does not use the same carrier frequency that the WCD is using in its current coverage area. In that scenario, the WCD and RAN would need to engage in an inter-frequency handoff, to switch to a frequency that is supported by the new coverage area. For instance, if the WCD is currently communicating on frequency F2 in a coverage area that implements frequencies F1 and F2, and the WCD moves into a coverage area that implements only frequency F1, the WCD could not continue to communicate on frequency F2 but would instead need to hand off from frequency F2 to frequency F1. Unfortunately, this inter-frequency handoff process poses an increased risk of call drop and is therefore not desirable. Further, similar issues may exist with other types of RAN resources as well.

Disclosed herein is a method and corresponding system to help improve resource allocation in a wireless communication system. In accordance with the method, an idle WCD (i.e., one not currently engaged in a call) will include with its connection initiation request in a given coverage area a motion specification that indicates whether and perhaps to what extent (e.g., what speed and perhaps what direction) the WCD is moving. Upon receipt of the connection initiation request, the RAN will then use that motion specification as a basis to determine whether the RAN should select a RAN resource for the call in the given coverage area based on RAN resource implementation in at least one neighboring coverage area, or whether the RAN should instead select the RAN resource for the call in the given coverage area without regard to RAN resource implementation in the at least one neighboring coverage area.

The theory is that if the WCD is moving at least a threshold extent, then there may be a reasonable chance that the WCD may hand off to the at least one neighboring coverage area during the call, and so it would be preferable in that scenario for the RAN to assign a resource in the initial coverage area that is also used in the at least one neighboring coverage area, so that the WCD could potentially continue to use the same resource as the WCD engages in a handoff. On the other hand, if the WCD is not moving at least the threshold extent, then there may be a reasonable chance that the WCD may not hand off to the at least one neighboring coverage area during the call, and so the RAN could more simply assign a resource in the current coverage area without regard to whether the at least one neighboring coverage area also uses the resource.

Further, by having the WCD itself provide the RAN with the motion specification together with (e.g., in) its connection request to the RAN, the RAN would receive the motion specification at the time the RAN needs the information in order to make the resource allocation decision. Thus, the method can avoid the need for the RAN to engage in a complex process of determining motion of the WCD after receiving the connection initiation request. Moreover, in a practical implementation of the method, the WCD would track its own motion and accordingly generate and provide the motion specification, and so the motion specification may be an accurate representation of whether and to what extent the WCD is moving or has been moving.

These as well as other aspects, advantages, or alternatives will become apparent to those of ordinary skill in the art by reading the following detailed description, with reference where appropriate to the accompanying drawings. Further, it should be understood that the description provided by this overview section and elsewhere in this document is intended to explain and illustrate the invention by way of example only.

DETAILED DESCRIPTION

Figure 1:
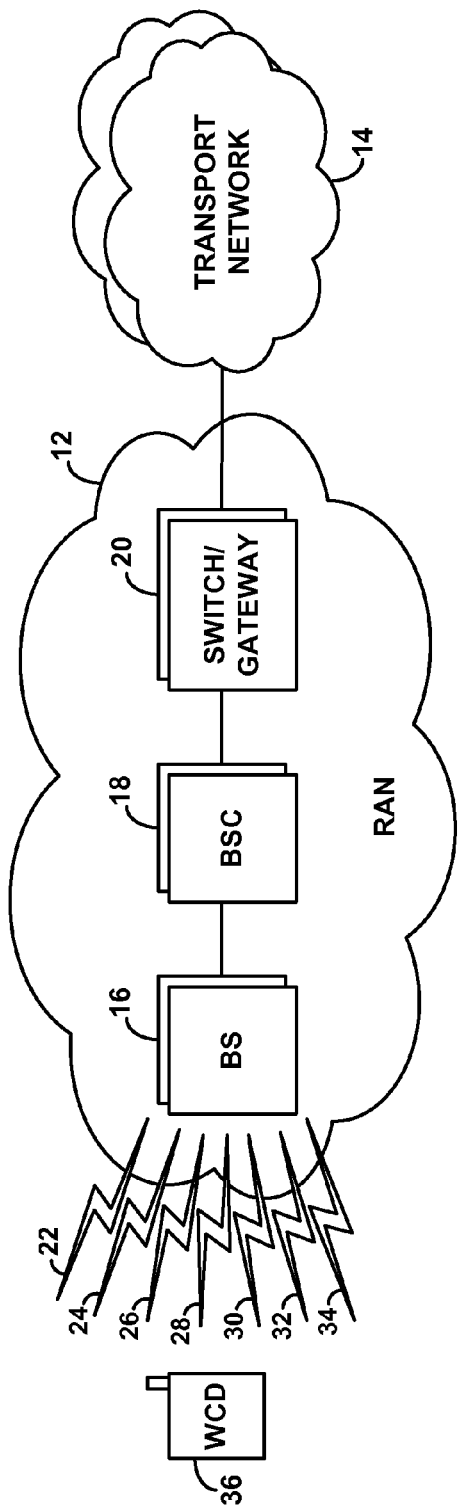
FIG. 1 is a simplified block diagram of a cellular wireless communication system in which the present method can be implemented.

The present method will now be described with reference to the figures. It should be understood, however, that numerous variations from the arrangement and functions shown are possible while remaining within the scope and spirit of the claims. For instance, elements may be added, removed, combined, distributed, substituted, re-positioned, re-ordered, or otherwise changed. Further, where this description refers to functions being implemented one or more machines such as a WCD and/or a RAN, it will be understood that the machines can carry out the functions by themselves or with the assistance of other machines, and through application of hardware, firmware and/or software logic. For instance, a machine may include a processor programmed with instructions to implement the functions described.

Referring to the drawings, as noted above, FIG. 1 is a simplified block diagram of a cellular wireless communication system in which the present method can be implemented. The system includes at its core a radio access network (RAN) 12 that functions to provide served WCDs with communication service, such as access to one or more transport networks 14 for instance. As shown, the example RAN 12 includes one or more base stations (BSs) 16, one or more base station controllers (BSCs) 18, and one or more switches/gateways 20 providing connectivity with the transport network(s) 14. A suitable RAN can take other forms as well, ranging in degree of complexity and scope of operation.

Each base station preferably includes one or more antenna arrangements and associated equipment for radiating to define one or more wireless coverage areas, in which mobile stations may operate. FIG. 1 depicts representative coverage areas 22-34 by way of example. These coverage areas may emanate from a common base station or may emanate from separate base stations, and the coverage areas preferably overlap with each other to facilitate handoff from one coverage area to another.

Further, shown operating in coverage of the RAN is an example WCD 36. WCD 36 may be a cellular telephone, wirelessly equipped personal digital assistant or personal computer, embedded wireless device, wireless tracking device, or other wirelessly equipped device.

Air interface communications between a base station and WCDs in each coverage area may comply with an agreed air interface protocol, examples of which include CDMA (e.g., 1xRTT or 1xEV-DO), iDEN, WiMAX, LTE, GSM, HSDPA, and others now known or later developed. Communications in the direction from the RAN to mobile stations define a "forward link", while those in the direction from mobile stations to the RAN define a "reverse link".

In each coverage area, the RAN may implement one or more frequency channels each defined by at least one carrier frequency. For instance, each frequency channel may define a forward link frequency and a corresponding reverse link frequency. Further, the air interface may be divided into particular communication channels through a mechanism such as time division multiplexing, code division multiplexing, and/or frequency division multiplexing, for instance. By way of example, the forward link may define a pilot channel on which the RAN broadcasts a pilot signal for use by WCDs to detect and evaluate coverage (with each pilot signal including or embodying an identifier of the coverage area), a paging channel on which the RAN may page WCDs, and one or more traffic channels on which the RAN transmits bearer data to WCDs that are actively engaged in calls (e.g., voice calls or data communications). The reverse link, on the other hand, may define an access channel on which WCDs may send requests to initiate traffic connections for calls, and one or more traffic channels on which WCDs may transmit bearer traffic to the RAN.

When a WCD is positioned within a given coverage area and is not currently engaged in a call, the WCD is considered to be "idle." (Certain systems also define the concept of "dormancy" where certain RAN resources are assigned for the WCD but the WCD does not currently have an assigned air interface connection. For purposes of this description, a dormant WCD can be considered an idle WCD.) In the idle mode, a WCD may regularly monitor the pilot signal strength from various coverage areas, in an effort to identify the strongest pilot signal. The WCD may then "idle" in that coverage area, monitoring the paging channel of the coverage area for any page messages destined to the WCD. Further, if the idle WCD then moves about and detects a stronger coverage area, the WCD may engage in an "idle handoff" where the WCD transitions to idle in the stronger coverage area instead.

While idling in a coverage area, if a WCD seeks to initiate a call (e.g., automatically or in response to a user request, or in response to a page message from the RAN), the WCD may then transmit a connection initiation request to the RAN via its current coverage area. In practice, the WCD may transmit this request on an access channel defined on a particular frequency channel of the coverage area. More specifically, the WCD may transmit on the access channel an access probe message that carries data defining the connection initiation request.

Upon receipt of this request, as noted above, the RAN may then assign resources for the call and send a channel assignment message or the like (e.g., via a paging channel) to the WCD, to direct the WCD to proceed with the call using the assigned resources. For instance, if the RAN implements more than one frequency channel in the coverage area, the RAN may select one of the frequency channels to assign to the WCD. Further, if the RAN implements more than one traffic channel in the coverage area, the RAN may select one of the traffic channels to assign to the WCD. The RAN may then transmit a channel assignment message that designates the selected resources, and the call may proceed accordingly using the designated resources.

While the WCD is engage in a call, the WCD may similarly monitor the pilot signal strength from various coverage areas. If the WCD thereby detects a sufficiently stronger pilot signal from another coverage area, the WCD may engage in signaling with the RAN to facilitate a handoff of the call from the WCD's current coverage area to the new coverage area. As noted above, when that happens, the RAN would assign resources for the call in the new coverage area and would release resources that had been assigned for the call in the current coverage area. For instance, the RAN may assign a frequency channel and a traffic channel for the call in the new coverage area and send a handoff direction message to the WCD directing the WCD to transition to use those resources in the new coverage area and to discontinue communicating in the other coverage area.

Figure 2:
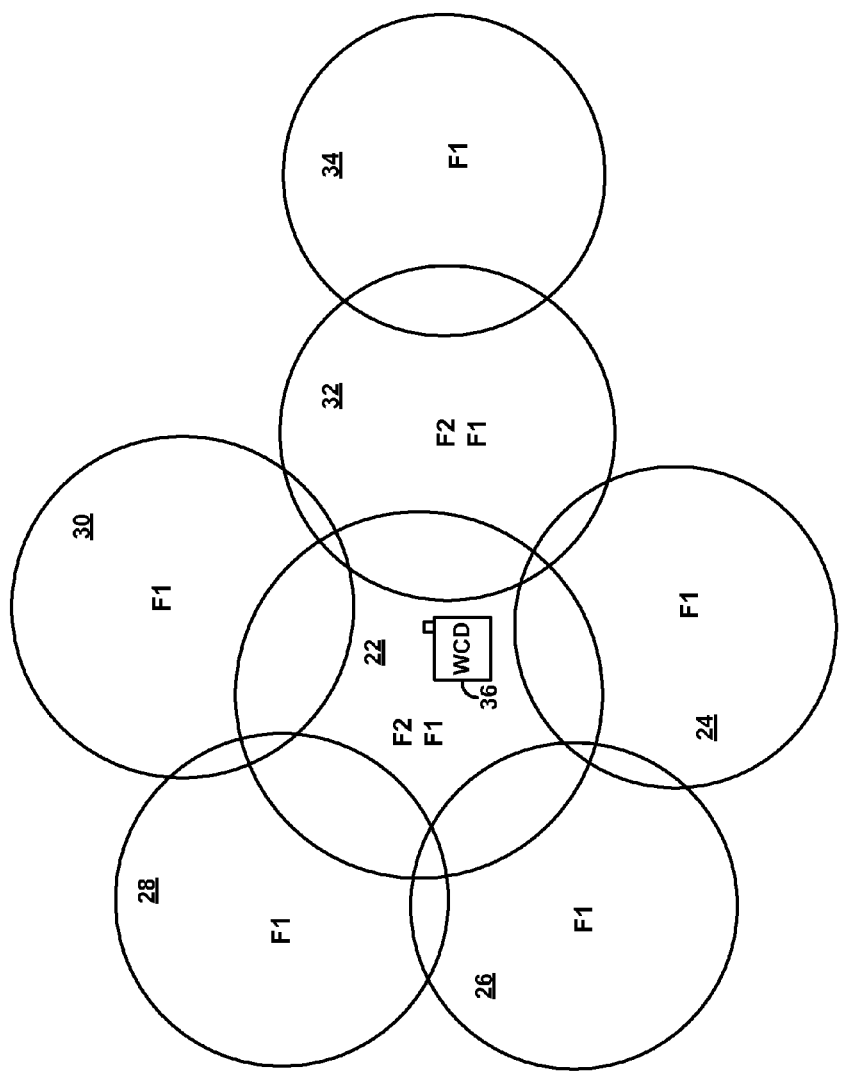
FIG. 2 is an illustration of overlapping coverage areas in an example scenario.

As noted above, there is a possibility that the coverage area into which a WCD hands off during an active call may not implement the same carrier frequency that the WCD was using for the call, and that the WCD may therefore need to engage in a risky inter-frequency handoff as a result. This may occur in a scenario where most wireless coverage areas throughout a region implement a core frequency F1 and some but not all of those wireless coverage areas also implement an overlay frequency F2. FIG. 2 depicts such an arrangement by way of example, which various overlapping coverage areas represented conceptually as circles.

As shown in FIG. 2, coverage 22 overlaps with coverage areas 24-32, and coverage area 32 overlaps with coverage area 34. All of the coverage areas 22-34 are shown implementing frequency F1. Further, coverage areas 22 and 32 are shown also implementing overlay frequency F2. WCD 36 is then shown currently operating in coverage area 22.

In this arrangement, if WCD 36 is currently engaged in a call on frequency F2 in coverage area 22 and WCD 36 moves from coverage area 22 into coverage area 30, the WCD would need to engage in an inter-frequency handoff from frequency F2 to frequency F1, because coverage area 30 does not implement frequency F2. However, as noted above, such an inter-frequency handoff process poses an increased risk of call drop and is therefore not desirable.

The present method helps to avoid this occurrence by having the WCD include a motion specification with the connection initiation request that the WCD sends to the RAN, and by having the RAN use that motion specification as a basis to facilitate selection and assignment of a resource, such as a carrier frequency, to the WCD. In particular, the WCD will preferably track its own motion over time so as to generate a motion specification indicating the extent of the WCD's movement, and the WCD will include that motion specification with (e.g., in) its connection initiation request to the RAN. If the motion specification indicates at least a threshold extent of movement by the WCD, then the RAN will consider resource implementation in at least one neighboring coverage area as a basis to decide which RAN resource (e.g., which carrier frequency) to assign to the WCD in the current coverage area. On the other hand, if the motion specification does not indicate at least the threshold extent of movement by the WCD (e.g., by not indicating at all, by indicating non-movement, or by indicating less than the threshold extent of movement), then the RAN will select and assign the RAN resource without regard to resource implementation in the at least one neighboring coverage area.

The WCD preferably tracks its motion over time while idle and/or active, and stores in its memory a record of its motion over time, for use in generating the motion specification to provide to the RAN when the WCD is idle and transmitting a connection initiation request.

The WCD may track its motion in various ways for this purpose. By way of example, the WCD may track how often the WCD transitions from one coverage area to another, such as how often the WCD engages in handoff (whether idle and/or active) between coverage areas. As another example, the WCD can employ a GPS receiver to track its own geographic location over time and can track how quickly its geographic location changes. Optimally with geographic location tracking and/or through use of a compass or other technique, the WCD may further track the direction in which it is traveling.

When it comes time to generate the motion specification, the WCD may provide as the motion specification a Boolean indication of movement or non-movement of the WCD, an indication of rate of movement of the WCD (e.g., rate of transition between coverage areas or rate of geographic movement) and/or a direction of movement of the WCD, by way of example.

The motion specification may define movement (or lack thereof) of the WCD for a period of time before the WCD generates the motion specification, such as for a period of time extending up to the point when the WCD generates the motion specification. For instance, if the WCD has moved at least a threshold extent (e.g., a threshold number of coverage area transitions, a threshold geographic distance, and/or a threshold speed) in the period of time, on average for example, then the WCD may provide in the motion specification a Boolean value indicating movement of the WCD. Whereas, if the WCD has not moved at least that threshold extent in the period of time, then the WCD may provide in the motion specification a Boolean value indicating non-movement of the WCD. Alternatively, the motion specification may specify a particular extent of movement of the WCD, such as speed of movement, rate of transition between coverage areas (e.g., count of coverage areas in which the WCD operated over the period of time), again as an average for instance.

The idle WCD may provide the motion specification with its connection initiation request in any format that the RAN is arranged to read and interpret, so that the RAN can make use of the motion specification when deciding which resource (e.g., which carrier frequency) to allocate to the WCD. By way of example, if the motion specification is a Boolean value, the WCD could provide the motion specification as a simple bit in a defined field of the access probe that carries or defines the connection initiation request. As another example, if the motion specification includes more information, the WCD could provide the motion specification as XML data or in some other form in defined fields of the access probe. Other examples are possible as well.

Figure 3:
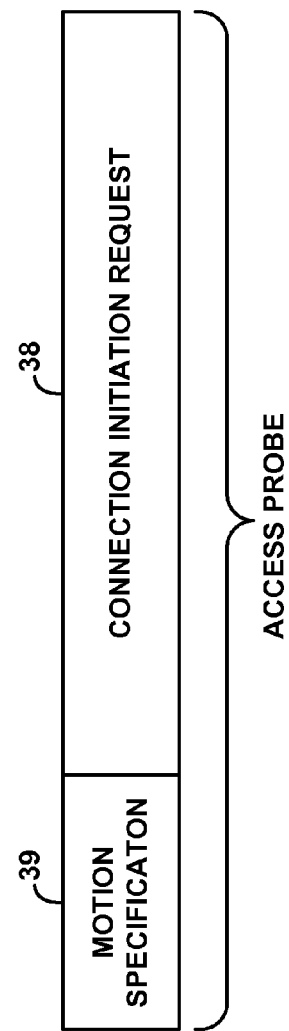
FIG. 3 is an illustration of an example connection initiation request with a motion specification in accordance with an example implementation.

FIG. 3 conceptually illustrates an access probe that an idle WCD may transmit to the RAN in accordance with the method, to request establishment of a traffic connection in the WCD's current coverage area and to concurrently provide the RAN with information about motion of the WCD. As shown, the access probe includes a connection initiation request segment 38 and a motion specification segment 39. These segments could alternatively be integrated together, with the motion specification being provided as part of the connection initiation request for instance, or the segments could be arranged in some other manner. (IN this regard, a recitation that the connection request contains the motion specification should be understood to encompass a scenario where the connection request is sent together with the motion specification, such as where an access probe defining the connection request also contains the motion specification.)

When the RAN receives from the WCD in a given coverage area a connection initiation request with a motion specification, the RAN may then use the motion specification as a basis to decide whether base resource allocation in the given coverage area on resource implementation in at least one neighboring coverage area. As noted above, this decision could be based on whether the motion specification indicates at least threshold movement of the WCD.

By way of example, if the motion specification indicates any movement of the WCD, then the RAN may seek to allocate a resource in the given coverage that the RAN also uses in at least one neighboring coverage area. Whereas, if the motion specification does not indicate any movement of the WCD (e.g., indicates non-movement of the WCD), then the RAN may allocate a resource in the given coverage area without regard to resource implementation in the at least one neighboring coverage area.

As another example, if the motion specification indicates at least a threshold speed of movement of the WCD (e.g., a threshold rate of transition between coverage areas or a threshold rate of change of geographic position), then the RAN may seek to allocate a resource in the given coverage area that the RAN also uses in at least one neighboring coverage area. Whereas, if the motion specification does not indicate at least the threshold speed of movement of the WCD (e.g., indicates movement of the WCD at lower than the threshold speed), then the RAN may allocate a resource in the given coverage without regard to resource implementation in the at least one neighboring coverage area.

Further, the extent of movement indicated by the motion specification may impact which and how many adjacent coverage area(s), if any, the RAN considers in this process.

For example, the speed of movement of the WCD as indicated by the motion specification may dictate what distance or tier of neighboring coverage areas the RAN would consider. For instance, if the motion specification indicates movement of the WCD at a first threshold speed, then the RAN may seek to allocate a resource in the given coverage area that the RAN also uses in one or more first tier neighbors (i.e., one or more coverage areas that directly border the given coverage area). Whereas if the motion specification indicates movement of the WCD at a higher threshold speed, then the RAN may seek to allocate a resource in the given coverage area that the RAN also uses in one or more first tier neighbors and one or more second tier neighbors (i.e., coverage areas that border any first tier neighbors), and so forth.

And as another example, if the motion specification indicates movement of the WCD in a particular direction, perhaps coupled with threshold speed of movement of the WCD, then the RAN may seek to allocate a resource in the given coverage area that the RAN also uses in at least one adjacent coverage area that is located in that direction from the given coverage area. Whereas, if the motion specification does not indicate movement of the WCD in the particular direction, then the RAN may allocated a resource in the given coverage area without regard to resource implementation in the at least one adjacent coverage area located in that direction.

As a practical example of this process, considering the arrangement in FIG. 2, assume that WCD 36 sends a call initiation request in coverage area 22. According to an example implementation of the present method, WCD 36 would include with the call initiation request a motion specification, and the RAN would use the motion specification as a basis to decide whether to allocate a resource in coverage area 22 based on resource implementation in one or more neighboring coverage areas or whether to allocate the resource in coverage area 22 without regard to resource implementation in the one or more neighboring coverage areas.

For instance, if the RAN determines that the motion specification indicates at least a threshold extent of movement of WCD 36, then the RAN may select a carrier frequency to assign to the WCD for the call in coverage area 22 based on resource implementation in one or more neighboring coverage areas. By way of example, the RAN may consider that some (or perhaps a majority) of the first tier neighbors of coverage area 22 have only carrier frequency F1 and not carrier frequency F2, and in response the RAN may decide to assign carrier frequency F1 for use by the WCD in coverage area 22.

On the other hand, if the RAN determines that the motion specification does not indicate at least the threshold extent of movement of the WCD, then the RAN may select a carrier frequency to assign to the WCD for the call in coverage area 22 without regard to resource implementation in the one or more neighboring coverage areas. For instance, the RAN may select the carrier frequency based on a hashing algorithm, based on load balancing, or based on some other factor or process.

As another example, if the RAN determines that the motion specification indicates movement of the WCD at a threshold speed toward coverage area 32, then the RAN may select a carrier frequency to assign to the WCD for the call in coverage area 22 based on resource implementation in coverage area 32. Here, since coverage areas 22 and 32 both implement frequencies F1 and F2, the RAN may thus select either of those frequencies to assign. Whereas, if the RAN determines that the motion specification indicates movement of the WCD at a higher threshold speed toward coverage area 32, then the RAN may select a carrier frequency to assign to the WCD for the call in coverage area 22 based on resource implementation in both coverage area 32 and second-tier neighbor coverage area 34. In that case, the RAN may determine that frequency F1 is the only frequency that is implemented in each of coverage areas 22, 32, and 34, and so the RAN may responsively select and assign that frequency to the WCD in coverage area 22. Other examples are possible as well.

Figure 4:
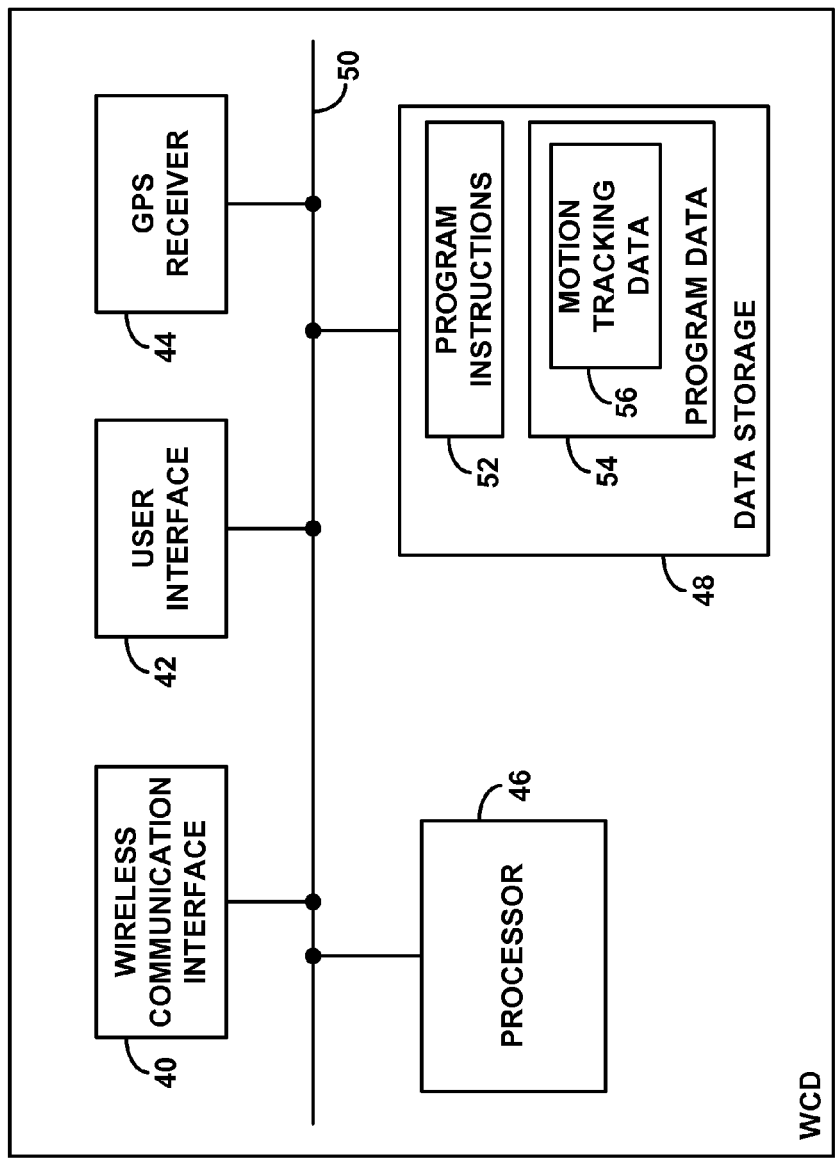
FIG. 4 is a simplified block diagram of a WCD operable in the method.

FIG. 4 is next a simplified block diagram of an example WCD 36, showing functional components of such a device arranged to carry out aspects of the present method. As shown, the example WCD includes a wireless communication interface 40, a user interface 42, a GPS receiver 44, a processor 46, and data storage 48, all of which may be communicatively linked together by a system bus or other connection mechanism 50. Although these components are shown as discrete elements in the block diagram, they may be combined or functionally integrated in various ways. For example, the processor and data storage may be elements of the wireless communication interface (e.g., on a wireless communication chipset). Other examples are possible as well.

Wireless communication interface 40 functions to facilitate air interface communication with the RAN according to an agreed air interface protocol, such as one or more of those noted above for instance, and may thus comprise a wireless communication chipset and associated antenna structure. User interface 42 functions to facilitate interaction with a user of the WCD and may thus comprise input and output components such as a keypad, display, speaker, and the like. And GPS receiver functions to receive GPS signals to enable the WCD to determine its location (possibly by itself or through interaction with a serving RAN).

Processor 46 may comprise one or more general purpose processors (e.g., INTEL processors) and/or one or more special purpose processors (e.g., digital signal processors and/or application specific integrated circuits). And data storage 48 may comprise one or more volatile and/or non-volatile storage components such as magnetic, optical, solid-state (e.g., flash), organic, or other storage mechanisms. As shown, data storage may contain program instructions 52 and program data 54. The program instructions 52 may be executable by the processor to carry out various WCD functions described herein. And the program data 54 may, as shown, contain data such as motion tracking data 56 as discussed above.

Figure 5:
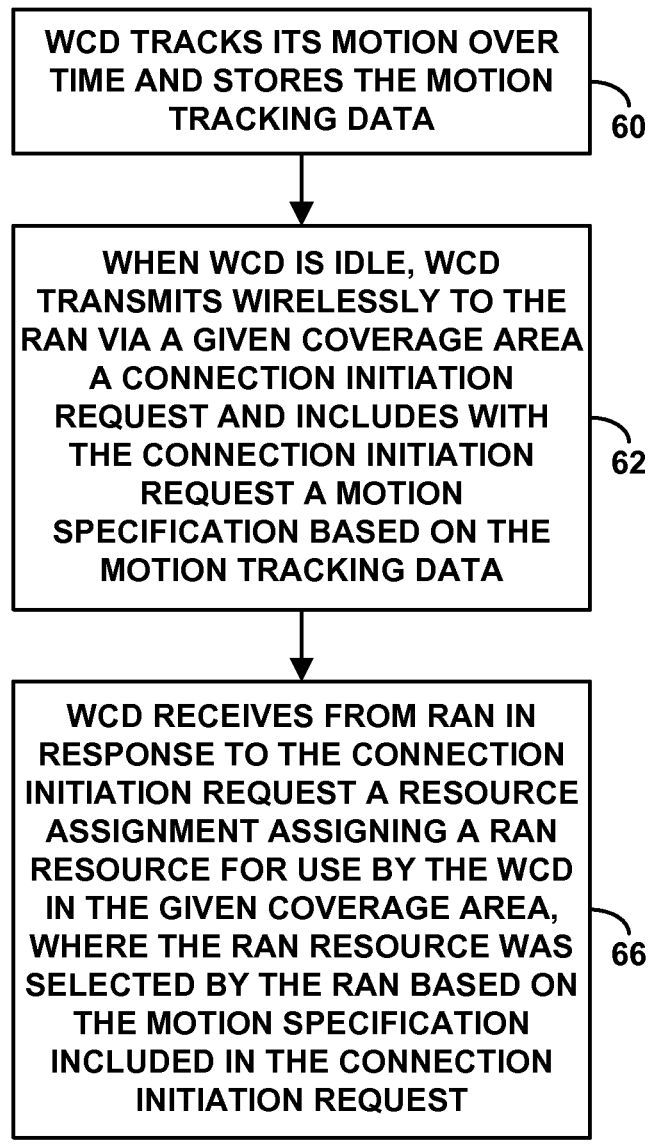
FIG. 5 is a flow chart depicting functions that can be carried out by the example device.

FIG. 5 is next a flow chart depicting in summary some of the functions that can be carried out by the WCD in accordance with an example implementation of the present method, to facilitate resource allocation. As shown in FIG. 5, at block 60, the WCD will track motion of the WCD over time and store the motion tracking data in data storage 48. At block 62, when the WCD is idle, the WCD will transmit wirelessly to the RAN via a given coverage area a connection initiation request and will include with (e.g., in) the connection initiation request a motion specification based on the motion tracking data 54. At block 64, the WCD will then receive from the RAN in response to the connection initiation request a resource assignment (e.g., channel assignment message) assigning a RAN resource (e.g., carrier frequency) for use by the WCD in the given coverage area, where the RAN resource was selected by the RAN based on the motion specification included in the connection initiation request.

Figure 6:
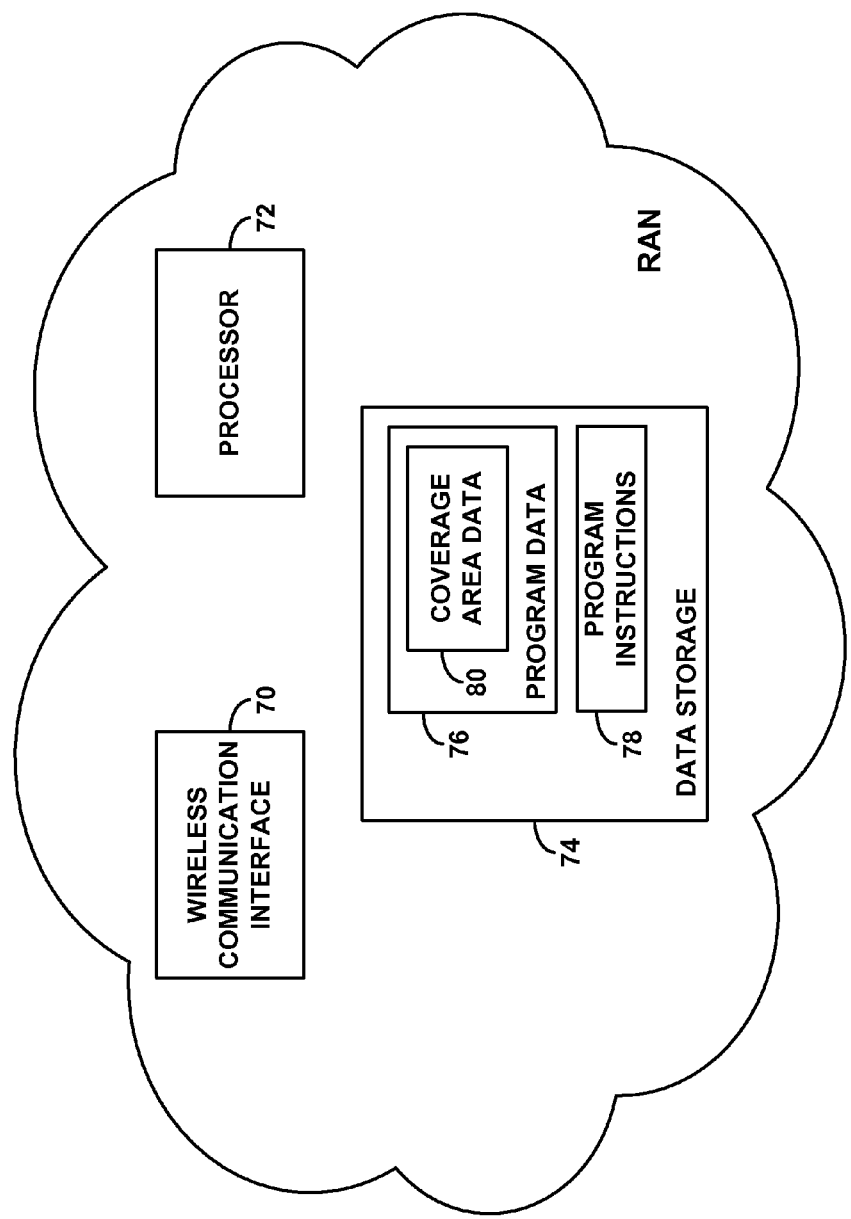
FIG. 6 is a simplified block diagram of a RAN operable in the method.

FIG. 6 is next a simplified block diagram depicting some of the functional components of an RAN arranged to carry out aspects of the present method. As shown, the RAN includes a wireless communication interface 70, a processor 72, and data storage 74, which may be coupled together in various ways and provided in one or more of the elements shown in FIG. 1 or other elements by way of example.

Wireless communication interface 70 may comprise one or more base stations with antenna arrangements for radiating to define various coverage areas. Processor 72, which may be implemented at the base station, at a base station controller, and/or at one or more other RAN entities, may comprise one or more general purpose processors and/or one or more special purpose processors. Data storage 74 may then comprise one or more volatile and/or non-volatile storage components such as magnetic, optical, solid-state (e.g., flash), organic, or other storage mechanisms. As shown, data storage may contain program data 76 and program instructions 78. The program data may comprise coverage area data 80, which may list various coverage areas defined by the RAN and may specify for each coverage area characteristics such as (i) location and span of the coverage area, (ii) resources, such as carrier frequencies, implemented by the RAN in the coverage area, and (iii) neighboring coverage areas. And the program instructions 78 may be executable by processor 72 to carry out various RAN functions described herein.

Figure 7:
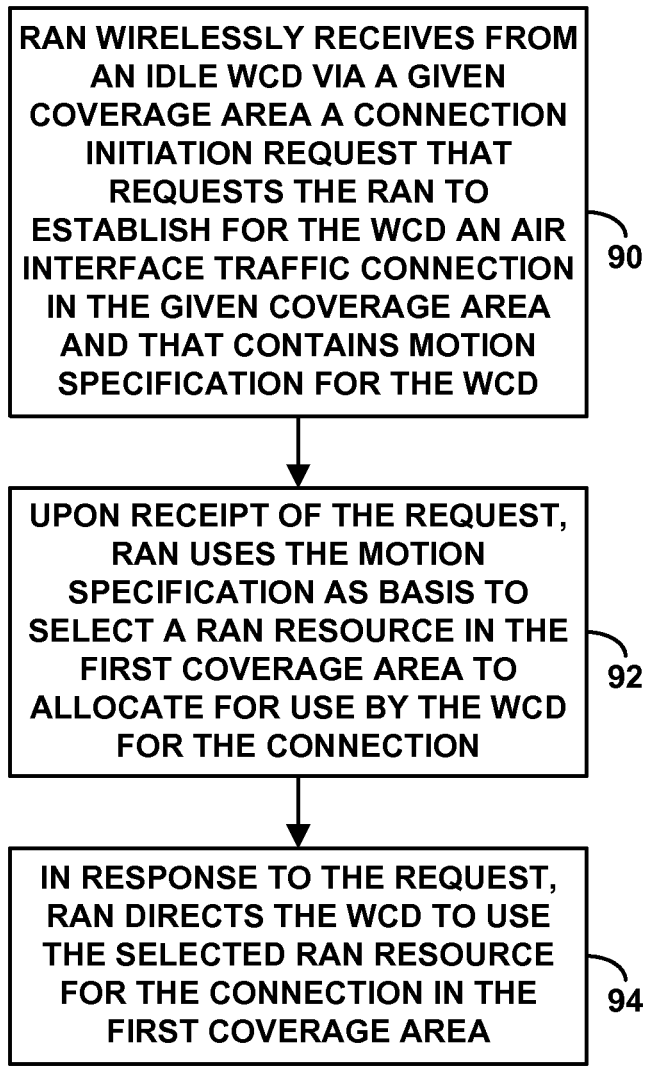
FIG. 7 is a flow chart depicting functions that can carried out by the example RAN.

FIG. 7 is next a flow chart depicting in summary some of the functions that can be carried out by the WCD in accordance with an example implementation of the present method, to facilitate resource allocation. As shown in FIG. 7, at block 90, the RAN will wirelessly receive from an idle WCD via a given coverage area a connection initiation request that requests the RAN to establish for the WCD an air interface traffic connection in the given coverage area and that contains motion specification for the WCD, generated and structured as described above for instance. At block 92, upon receipt of the request, the RAN then uses the motion specification as a basis to select a RAN resource (e.g., a frequency channel) in the first coverage area to allocate for use by the WCD for the connection. And at block 94, in response to the request, the RAN directs the WCD to use the selected RAN resource for the connection in the first coverage area.

An exemplary embodiment has been described above. Those of ordinary skill in the art will appreciate, however, that variations from the embodiment described are possible while remaining within the true spirit and scope of the invention.

We claim:

1. A method for resource allocation in a cellular wireless communication system including a radio access network (RAN) that radiates to define a plurality of wireless coverage areas, the method comprising:

receiving wirelessly into the RAN from an idle wireless communication device (WCD) via a first one of the wireless coverage areas a connection initiation request, the connection initiation request requesting the RAN to establish for the WCD an air interface traffic connection in the first wireless coverage area, and the connection request containing a motion specification of the WCD, wherein the motion specification indicates an extent of movement or non-movement of the WCD;

upon receipt of the request, the RAN using the motion specification as a basis to select a RAN resource in the first coverage area to allocate for use by the WCD for the connection, wherein using the motion specification as a basis to select the RAN resource comprises (a) making a determination of whether the motion specification indicates at least a threshold extent of movement of the WCD, (b) if the determination is that the motion specification indicates at least the threshold extent of movement of the WCD, then selecting the RAN resource based on whether the RAN also implements the RAN resource in a second coverage area neighboring the first coverage area, and (c) if the determination is that the motion specification does not indicate at least the threshold extent of movement of the WCD, then selecting the RAN resource without regard to whether the RAN also implements the RAN resource in the second coverage area; and in response to the request, the RAN directing the WCD to use the selected RAN resource for the connection in the first coverage area.

2. The method of claim 1, wherein the RAN resource is a frequency channel defined by at least one carrier frequency.

3. The method of claim 1, wherein the threshold extent of movement of the WCD comprises a threshold extent of movement of the WCD toward the second coverage area neighboring the first coverage area.

4. The method of claim 1, wherein the motion specification comprises a Boolean value having a state that indicates movement or non-movement of the WCD.

5. The method of claim 1, wherein the motion specification comprises a rate of movement of the WCD.

6. The method of claim 5, wherein the rate of movement represents a rate of transition of the WCD between coverage areas.

7. The method of claim 5, wherein the rate of movement is established by geographic position tracking of the WCD.

8. The method of claim 1, wherein the motion specification comprises a direction of movement of the WCD.

9. The method of claim 1, further comprising the WCD tracking motion of the WCD, generating the motion specification, and transmitting to the RAN the connection initiation request containing the motion specification.

10. The method of claim 1, wherein receiving the connection initiation request from the WCD comprises receiving the connection initiation request as an access probe via an air interface access channel defined in the first coverage area.

11. A method of resource allocation in a wireless communication system including a radio access network (RAN) that radiates to define a plurality of wireless coverage areas, the method comprising:

a wireless communication device (WCD) tracking motion of the WCD;

while the WCD is idle, the WCD transmitting wirelessly to the RAN via a first one of the wireless coverage areas, a connection initiation request, the connection initiation request requesting the RAN to establish for the WCD an air interface traffic connection in the first wireless coverage area, and the WCD including with the transmitted connection request a motion specification of the WCD based on the tracking by the WCD, wherein the motion specification indicates an extent of movement or non-movement of the WCD; and the WCD receiving from the RAN in response to the connection initiation request a resource assignment assigning a RAN resource for use by the WCD in the first wireless coverage area, the RAN resource having been selected by the RAN based on the motion specification included with the connection initiation request, wherein if the motion specification indicates at least a threshold extent of movement of the WCD, selection of the RAN resource is based on whether the RAN also implements the RAN resource in a second coverage area neighboring the first coverage area, and if the motion specification does not indicate at least the threshold extent of movement of the WCD, then selection of the RAN resource is without regard to whether the RAN also implements the RAN resource in the second coverage area.

12. The method of claim 11, wherein tracking motion of the WCD comprises tracking rate of transition of the WCD between coverage areas, and wherein the motion specification comprises the rate.

13. The method of claim 11, wherein tracking motion of the WCD comprises tracking rate of movement of geographic position of the WCD, and wherein the motion specification comprises the rate.

14. The method of claim 11, wherein tracking motion of the WCD comprises tracking direction of movement of the WCD, and wherein the motion specification comprises the direction of travel.

15. A resource allocation system comprising:

a radio access network (RAN) having a plurality of base transceiver stations that radiate to define a plurality of wireless coverage areas and to define in each coverage area an access channel through which the RAN receives access probes from wireless communication devices (WCDs);

the RAN being arranged to receive from an idle WCD via a first coverage area a connection initiation request requesting establishment for the WCD of an air interface traffic connection in the first wireless coverage area and that includes a motion specification of the WCD, wherein the motion specification indicates an extent of movement or non-movement of the WCD;

the RAN being arranged to use the motion specification as a basis to select a RAN resource in the first coverage area to allocate for use by the WCD for the connection, wherein using the motion specification as a basis to select the RAN resource comprises (a) making a determination of whether the motion specification indicates at least a threshold extent of movement of the WCD, (b) if the determination is that the motion specification indicates at least the threshold extent of movement of the WCD, then selecting the RAN resource based on whether the RAN also implements the RAN resource in a second coverage area neighboring the first coverage area, and (c) if the determination is that the motion specification does not indicate at least the threshold extent of movement of the WCD, then selecting the RAN resource without regard to whether the RAN also implements the RAN resource in the second coverage area; and in response to the request, the RAN directing the WCD to use the selected RAN resource for the connection in the first coverage area.

16. The resource allocation system of claim 15, further comprising the WCD, wherein the WCD is arranged to track motion of the WCD, to generate the motion specification based on the tracking of motion of the WCD, to include the motion specification in the connection initiation request, and to transmit to the RAN the connection request including the motion specification.

17. The resource allocation system of claim 16, wherein the connection request is provided as an access probe on the access channel in the first coverage area.

18. The resource allocation system of claim 16, wherein the motion specification includes a Boolean value that indicates movement or non-movement of the WCD.

19. The resource allocation system of claim 16, wherein tracking motion of the WCD comprises tracking rate of transition of the WCD between coverage areas, wherein the motion specification comprises the rate.

* * * * *